US010494751B2

(12) United States Patent
Stabon et al.

(10) Patent No.: US 10,494,751 B2
(45) Date of Patent: Dec. 3, 2019

(54) LAUNDRY WASHING MACHINE WITH WATER SOFTENING SYSTEM AND METHOD FOR CONTROLLING A LAUNDRY WASHING MACHINE

(71) Applicant: Electrolux Appliances Aktiebolag, Stockholm (SE)

(72) Inventors: Elisa Stabon, Gorizia (IT); Andrea Zattin, Solesino (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 76 days.

(21) Appl. No.: 15/108,816

(22) PCT Filed: Dec. 30, 2013

(86) PCT No.: PCT/EP2013/078135
§ 371 (c)(1),
(2) Date: Jun. 29, 2016

(87) PCT Pub. No.: WO2015/101391
PCT Pub. Date: Jul. 9, 2015

(65) Prior Publication Data
US 2016/0326678 A1    Nov. 10, 2016

(51) Int. Cl.
*D06F 39/00* (2006.01)
*D06F 33/02* (2006.01)
(Continued)

(52) U.S. Cl.
CPC ............ *D06F 39/004* (2013.01); *D06F 33/02* (2013.01); *D06F 39/007* (2013.01);
(Continued)

(58) Field of Classification Search
CPC ... D06F 39/004; D06F 39/007; C02F 2307/12
(Continued)

(56) References Cited

U.S. PATENT DOCUMENTS 5,167,722 A    12/1992   Pastryk et al.
5,272,892 A    12/1993   Janutka et al.
(Continued)

FOREIGN PATENT DOCUMENTS

CH    704603 A2     7/2012
DE    3519831 A1   12/1986
(Continued)

OTHER PUBLICATIONS

Machine translation of JP-2001017775-A, dated Jan. 2001. (Year: 2001).*

(Continued)

*Primary Examiner* — Joseph L. Perrin
*Assistant Examiner* — Kevin G Lee
(74) *Attorney, Agent, or Firm* — RatnerPrestia

(57) ABSTRACT

Laundry washing machine (1) has an outer casing (2), a washing tub (3), arranged inside the casing (2), a rotatable drum (4), arranged in axially rotating manner inside the washing tub (3) and is designed to receive laundry to be washed. The machine further has a detergent dispensing assembly (12), designed for supplying laundry detergent into the washing tub (3), a water softening system (14), designed to receive fresh water from a water mains (13) and reduce the hardness degree of the fresh water in order to supply softened water to the detergent dispensing assembly (12) and/or to the washing tub (3), during one or more softened water laundry washing phases. The machine further has a control panel (28) configured to allow operator to input information associated with a laundry washing course having one or more softened water laundry washing phase/s; and a controller (15) configured to determine a detergent saving amount (QS) to load in the detergent dispensing assembly (12) and/or to supply to the washing tub (3), based
(Continued)

on the softened water laundry washing phase/s of the laundry washing course to be performed.

23 Claims, 7 Drawing Sheets

(51) Int. Cl.
  *D06F 39/02* (2006.01)
  *D06F 39/08* (2006.01)
  *D06F 35/00* (2006.01)
(52) U.S. Cl.
  CPC ........ *C02F 2307/12* (2013.01); *D06F 35/006* (2013.01); *D06F 39/005* (2013.01); *D06F 39/02* (2013.01); *D06F 39/088* (2013.01); *Y02B 40/56* (2013.01)
(58) Field of Classification Search
  USPC ...................................................... 8/158, 159
  See application file for complete search history.

(56) References Cited

U.S. PATENT DOCUMENTS

| | | | |
|---|---|---|---|
| 6,169,964 B1* | 1/2001 | Aisa | A47L 15/0047 700/291 |
| 6,557,382 B1 | 5/2003 | Koike et al. | |
| 2005/0103631 A1 | 5/2005 | Freydina et al. | |
| 2005/0252538 A1 | 11/2005 | Vernon et al. | |
| 2007/0028397 A1 | 2/2007 | Park et al. | |
| 2008/0000272 A1 | 1/2008 | Park et al. | |
| 2009/0114598 A1* | 5/2009 | van Kralingen | A47L 15/4229 210/676 |
| 2010/0287709 A1 | 11/2010 | Doyle et al. | |
| 2012/0174631 A1 | 7/2012 | Cho et al. | |
| 2012/0180227 A1 | 7/2012 | Kim et al. | |
| 2012/0203391 A1* | 8/2012 | Lee | H04L 12/10 700/295 |
| 2013/0263387 A1 | 10/2013 | Aykroyd et al. | |
| 2015/0368848 A1 | 12/2015 | Del Pos et al. | |

FOREIGN PATENT DOCUMENTS

| | | | |
|---|---|---|---|
| DE | 19940162 A1 | | 3/2001 |
| DE | 102005049078 A1 | | 4/2007 |
| DE | 102010028445 A1 | | 11/2011 |
| DE | 102013206359 A1 | | 10/2014 |
| EP | 0467028 A1 * | 1/1992 | ............ C02F 1/1441 |
| EP | 0749720 A1 | | 12/1996 |
| EP | 0861114 A1 | | 9/1998 |
| EP | 1085118 A2 | | 3/2001 |
| EP | 2486180 B1 | | 8/2012 |
| EP | 2565319 A1 | | 3/2013 |
| EP | 2657387 A1 | | 10/2013 |
| GB | 1442616 A | | 7/1976 |
| JP | 2001017775 A * | 1/2001 | |
| JP | 2001017775 A | | 1/2001 |
| WO | 2006079417 A1 | | 8/2006 |
| WO | 2007108645 A1 | | 9/2007 |
| WO | 2009066940 A2 | | 5/2009 |
| WO | 2011042341 A1 | | 4/2011 |
| WO | 2011080241 A1 | | 7/2011 |

OTHER PUBLICATIONS

International Search Report issued in related International Application No. PCT/EP2013/078134, dated Jul. 28, 2014.
International Search Report in corresponding International Application No. PCT/EP2014/064414 dated Sep. 17, 2014.
International Search Report in corresponding International Application No. PCT/EP2014/064413 dated Sep. 17, 2014.
International Search Report in corresponding International Application No. PCT/EP2013/078133 dated Mar. 25, 2014.
International Search Report in related International Application No. PCT/EP2013/078135, dated Oct. 6, 2014.
Non Final Office Action for U.S. Appl. No. 15/108,815, dated Dec. 14, 2018, 32 pages.
Non Final Office Action for U.S. Appl. No. 15/108,895, dated Nov. 28, 2018, 15 pages.
Final Office Action for U.S. Appl. No. 15/108,895, dated Mar. 21, 2019, 7 pages.
Final Office Action for U.S. Appl. No. 15/108,815, dated Mar. 21, 2019, 18 pages.
Australian Examination Report for Australian Application No. 2013409579, dated Feb. 4, 2019, 4 pages.
Non Final Office Action for U.S. Appl. No. 15/108,814, dated Jun. 14, 2019, 11 pages.
Non Final Office Action for U.S. Appl. No. 15/108,985, dated Jun. 14, 2019, 9 pages.
Notice of Allowance for U.S. Appl. No. 15/108,895, dated Jun. 4, 2019, 7 pages.
Notice of Allowance for Appl. No. 15/108,985, dated Oct. 9, 2019, 10 pages.
Notice of Allowance for Appl. No. 15/108,814, dated Oct. 4, 2019, 17 pages.

* cited by examiner

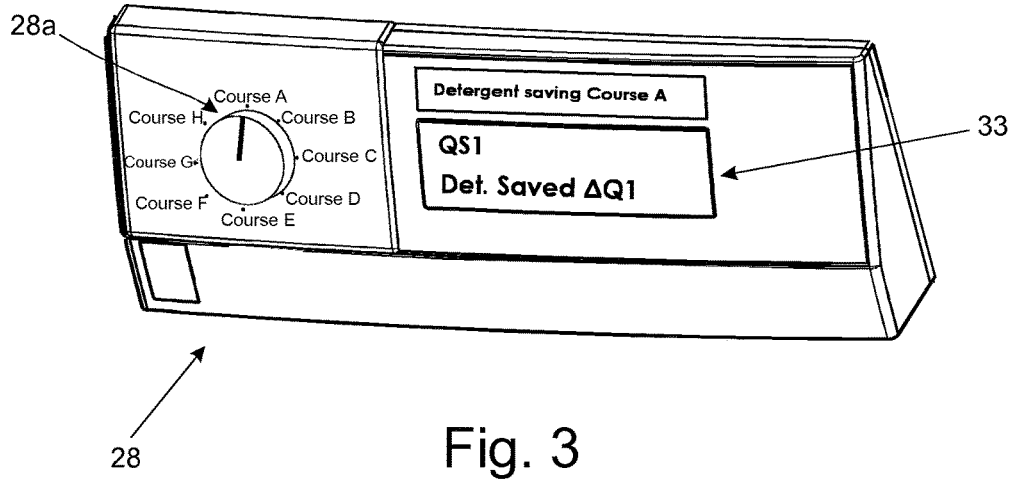

Fig. 3

| User selection washing course | Main Wash phase | Secondary laundry wash phases | | | | | QSi | ΔQi |
|---|---|---|---|---|---|---|---|---|
| | | First Rinse | Second Rinse | .... Rinse | .... Rinse | Last Rinse | | |
| Detergent saving washing course A | Soft. Water | Fresh Water | Fresh Water | Fresh Water | Fresh Water | Fresh Water | QS1 | ΔQ1 |
| Detergent saving washing course B | Soft. Water | Mix. Water | Fresh Water | Fresh Water | Fresh Water | Fresh Water | QS2 | ΔQ2 |
| Detergent saving washing course C | Soft. Water | Mix. Water | Mix. Water | Fresh Water | Fresh Water | Fresh Water | QS3 | ΔQ3 |
| Detergent saving washing course D | Soft. Water | Mix. Water | Mix. Water | Mix. Water | Fresh Water | Fresh Water | QS4 | ΔQ4 |
| | | | | | | | | |
| Detergent saving washing course N-1 | Soft. Water | Soft. Water | Soft. Water | Soft. Water | Soft. Water | Mix. Water | QSN-1 | ΔQN-1 |
| Detergent saving washing course N | Soft. Water | Soft. Water | Soft. Water | Soft. Water | Soft. Water | Soft. Water | QSN | ΔQN |

Fig. 4

LAUNDRY WASHING MACHINE WITH WATER SOFTENING SYSTEM AND METHOD FOR CONTROLLING A LAUNDRY WASHING MACHINE

FIELD

The present invention concerns the field of laundry washing techniques.

In particular, the present invention refers to a laundry washing machine and a method for controlling a laundry washing machine provided with a water softener system. More particularly, to a front-loading home laundry washing machine designed to perform detergent-saving functions and control method thereof, to which the following description refers purely by way of example without this implying any loss of generality.

BACKGROUND

Nowadays the use of laundry treatment appliances, such as laundry washing machines, i.e. laundry washing machines which wash and rinse laundry, or laundry washing and drying machines, i.e. laundry washing machines which can also dry laundry, is widespread. In this respect, in the present description, where not stated differently, the term "laundry washing machine" can be referred to a laundry washing machine, or a laundry washing and drying machines.

Laundry washing machines generally comprise an external casing provided with a washing tub which comprises a rotatable perforated drum where the laundry is placed, an electric motor which rotates the drum in the washing tub, a water-detergent supplying system, which supplies fresh water and detergent into the washing tub/drum, and a water draining system which discharges/drains wash water/detergent from the washing tub.

Laundry washing machines further comprise a control panel provided for a user to select a laundry washing course to be performed, such as cotton, delicates, wool, silk etc. and a controller configured to control several operating devices/apparatus of the laundry washing machine so as to perform the laundry washing phases based on the selected laundry washing course.

Recently, to prevent wastage of detergent and its known negative consequences on the environment, it is required to provide laundry washing machines which allow for optimization/reduction of the detergent consumption. In fact, the user of a laundry washing machine tends to introduce in the machine more detergent than is strictly necessary, thus causing a useless waste and a negative effect on the environment. So it is usual to instruct the user, on the instruction manuals and the detergent packagings, to regulate the dosage of detergent in function of washing course to be performed and/or washing parameters, such as temperature/time etc. However, several times the user does not follow this advice due to lack of specific culture or other reasons causing the drawbacks as stated above.

The Applicant conducted an in-depth study with the objective of providing a laundry washing machine which is designed to:

perform laundry washing courses requiring an amount of detergent lower than the nominal amount of detergent required by known standard laundry washing courses provide the user, before starting the laundry washing courses, indication about the right amount of detergent to use, and/or the amount of saved detergent.

SUMMARY OF SELECTIVE INVENTIVE ASPECTS

According to aspects of the present invention, there is provided Laundry washing machine comprising an outer casing, a washing tub which is arranged inside the casing, a rotatable drum, which is arranged in axially rotating manner inside the washing tub and is designed to receive laundry to be washed, a detergent dispensing assembly, which is designed for supplying laundry detergent into the washing tub, a water softening system, which is designed to receive fresh water from a water mains and reduce the hardness degree of the fresh water in order to supply softened water to the detergent dispensing assembly and/or to the washing tub, during one or more softened water laundry washing phases; a control panel configured to allow operator to input information associated with a laundry washing course to be performed, wherein said laundry washing course comprises one or more softened water laundry washing phase/s; and a controller configured to provide detergent information based on softened water laundry washing phase/s of said laundry washing course to be performed.

Preferably, said a controller is configured to provide, by said control panel, said detergent information containing data assisting user in determining a detergent saving amount to be used to perform said selected laundry washing course.

Preferably, said controller is configured to determine a detergent saving amount to be loaded in the detergent dispensing assembly and/or to be supplied into the washing tub based on the softened water laundry washing phase/s of the selected laundry washing course.

Preferably, said detergent information contains said determined detergent saving amount.

Preferably, said laundry washing course further comprises one or more fresh water laundry washing phase/s wherein fresh water is supplied to detergent dispensing assembly and/or to the washing tub; said controller being configured to determine said detergent saving amount based on the softened water laundry washing phase/s and the fresh water laundry washing phase/s of the laundry washing course to be performed.

Preferably, said laundry washing course further comprises one or more mix water laundry washing phase/s, wherein a mixture of fresh water and softened water is supplied to detergent dispensing assembly and/or to the washing tub; said controller being further configured to determine said detergent saving amount based on the softened water laundry washing phase/s and the mix water laundry washing phase/s of the laundry washing course to be performed.

Preferably, said controller is further configured to determine said detergent saving amount based on the softened water laundry washing phase/s, the mix water laundry washing phase/s and the fresh water laundry washing phase/s of the laundry washing course to be performed.

Preferably, said washing course comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

Preferably, the main laundry wash phase comprises: a wetting phase (step of loading water and detergent into the washing tub), a maintenance phase (step of tumbling the laundry for detergent action), a drain phase (step of draining water), and preferably, although not necessarily, a spin phase (step of spinning the drum).

Preferably, if the course to be performed uses heated water, the main laundry wash phase can further comprise a heating phase (step of switching-on the heating device 11) which is performed after the wetting phase and preferably before the maintenance phase.

Preferably, the drain phase is the last phase of the main laundry wash phase, and is performed before executing the first rinse phase of the secondary laundry wash phases following the main laundry wash phase.

Preferably, the rinse phases following the main laundry wash phase, may comprise a water loading phase (loading water into the washing tub), a rinse maintenance phase (tumbling the laundry), a drain phase, and preferably a spin phase.

Preferably, said control panel is configured to allow operator to select a washing course among one or more predetermined detergent saving washing courses, wherein each detergent saving washing course comprises one or more softened water laundry washing phase/s.

Preferably, memory means contains data relating to one or more detergent saving washing courses, said memorized data being indicative of loading of softened water, or fresh water, or mix water to the detergent dispensing assembly and/or the washing tub during laundry washing phases of detergent saving washing courses, and being associated with a detergent saving amount; said controller being configured to: selectively activate said water softening system based on said selected detergent saving washing course in order to supply softened water to the detergent dispensing assembly and/or the washing tub during at least said main laundry wash phase, and determine said detergent saving amount in response of said selected detergent saving washing course.

Preferably, control panel comprises: a first select part configured to allow operator to input first information indicative of a laundry washing course; a second select part configured to allow operator to input second information indicative of one or more detergent saving commands; said controller being configured to determine/set the detergent saving washing course based on received first and second information; said detergent saving washing course comprises one or more softened water laundry washing phase/s.

Preferably, said first select part is configured to allow operator to select a laundry washing course among one or more predetermined fresh water laundry washing courses, a fresh water laundry washing course comprising only fresh water washing phases, and being associated with a preset detergent amount; said second select part being configured to allow operator to input said second information indicative of one or more detergent saving commands associated with respective detergent saving levels; said controller being further configured to set the detergent saving laundry washing course based on the selected fresh water laundry washing course and said detergent saving commands, and determine the detergent saving amount by reducing said preset detergent amount on the basis on said detergent saving commands. Preferably, said controller is further configured to set the detergent saving laundry washing course by replacing one or more fresh water washing phases of the fresh water washing course with respective softened water washing phases ad/or mix water laundry washing phases, based on said detergent saving commands; and control said water softening system in response to the softened water washing phase/s of the set detergent saving laundry washing to supply softened water during at least the main laundry wash phase and/or during one or more of the secondary laundry wash phase/s.

Preferably, said first select part is configured to allow operator to select a water laundry washing course among one or more softened water laundry washing courses, a softened water laundry washing course comprising one or more softened water laundry washing phase/s and being associated with a prefixed detergent amount; said second select part being configured to allow operator to input said second information indicative of at least one detergent saving command; said controller being configured to determine said detergent saving amount by reducing said preset amount of detergent on the basis on said detergent saving command.

Preferably, said controller is further configured to control said water softening system in response to the softened water washing phase/s of the set detergent saving laundry washing and said detergent saving command to supply softened water during at least the main laundry wash phase and/or during one or more of the secondary laundry wash phase/s.

Preferably, the controller is configured to determine a saved amount of detergent based on detergent saving amount; said control panel being configured to provide the user with information relating to the saved amount of detergent.

Preferably, said dispensing assembly comprises detergent dosing means configured to automatically supply the detergent to said washing tub based on said determined detergent saving amount.

Preferably, the control panel is configured to provide operator with at least one of the following: an indication of said preset detergent amount; an indication of the detergent saving amount; an indication of the difference between said preset detergent amount and said detergent saving amount.

Preferably, softened water has a reduced hardness degree which is lower than about 15 FH.

Preferably, softened water has a reduced hardness degree which is lower or equal than about 5 FH.

Preferably, softened water has a reduced hardness degree which is lower or equal than about 2 FH.

Preferably, softened water has a reduced hardness degree which is lower or equal than about 1 FH.

Preferably, mix water has a reduced hardness degree which is greater than, or equal to about 15 FH, and lower than, or equal to about 25 FH.

Preferably, said main laundry wash phase comprises a softened water laundry wash phase; each secondary laundry wash phase comprises: a softened water laundry wash phase or a fresh water laundry wash phase or a mix water laundry wash phase.

Preferably, water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

Preferably, an electrically-powered brine-circulating pump is interposed between the water-softening agent container and the regeneration-agent reservoir and is structured for transferring/moving the brine (i.e. the salt water) from the regeneration-agent reservoir to the water-softening agent container when activated.

Preferably, water softening system comprises at least a flow through capacitor comprising plates having a conductive surface, wherein the plates are chargeable in response to an applied voltage to remove ions dissolved in the fresh water.

Further aspects of the present invention relate to a method for controlling a laundry washing machine comprising: an outer casing, a washing tub, which is arranged inside the casing, a rotatable drum, which is arranged in axially rotating manner inside the washing tub and is designed to receive laundry to be washed, a detergent dispensing assembly, which is designed for supplying laundry detergent into the washing tub, a water softening system, which is designed to receive fresh water from a water mains and reduce the hardness degree of the fresh water in order to supply softened water the detergent dispensing assembly and/or to the washing tub, during one or more softened water laundry washing phases; a control panel configured to allow operator to input information associated with a laundry washing course comprising one or more softened water laundry washing phase/s; the method comprising the step providing detergent information based on softened water laundry washing phase/s of said laundry washing course to be performed.

The method further comprise the steps of determining an detergent saving amount to load in the detergent dispensing assembly and/or to supply to the washing tub, based on the softened water laundry washing phase/s of the laundry washing course to be performed.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular:

FIG. 3 schematically illustrates a first embodiment of a user control panel of the laundry washing machine illustrated in FIG. 1;

FIG. 4 shows an example of a table containing detergent saving washing courses selectable by the control panel illustrated in FIG. 3;

DETAILED DESCRIPTION OF THE INVENTION

Aspects of the present invention have proved to be particularly advantageous when applied to a laundry treatment machine, such as laundry washing machines, as described below. It should be understood that although the present invention is described with reference to a laundry washing machine, other applications are contemplated. As can be appreciated, aspects of the present invention can be conveniently applied to other laundry treatment appliances, like for example laundry washing and drying machines (called also washer/driers), wherein one or more steps of introducing water and/or steam and/or hot/cool air inside a laundry tub may be required.

Figure 1:
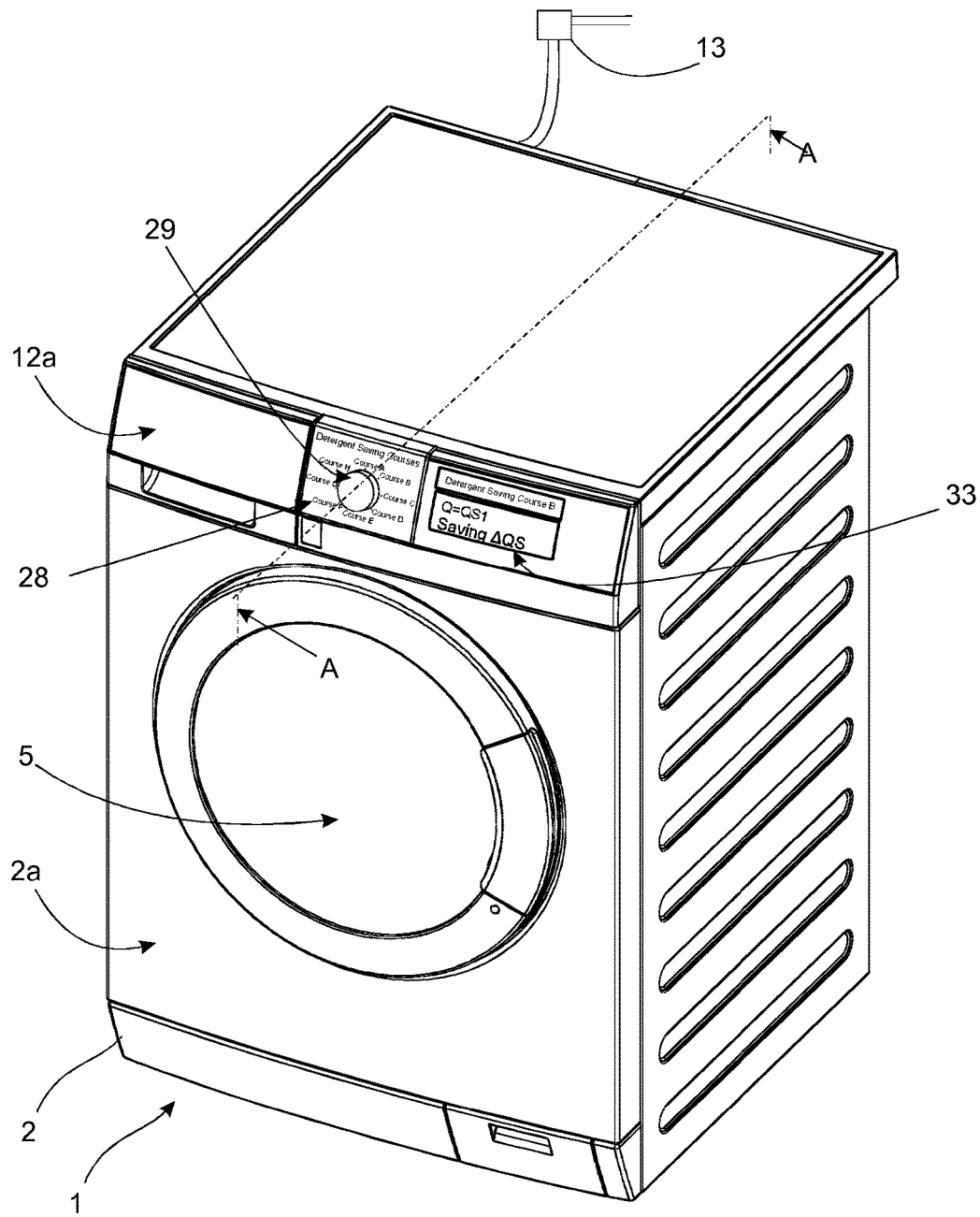
FIG. 1 is a schematic perspective view of a laundry washing machine according aspects of to the present invention.
Figure 2:
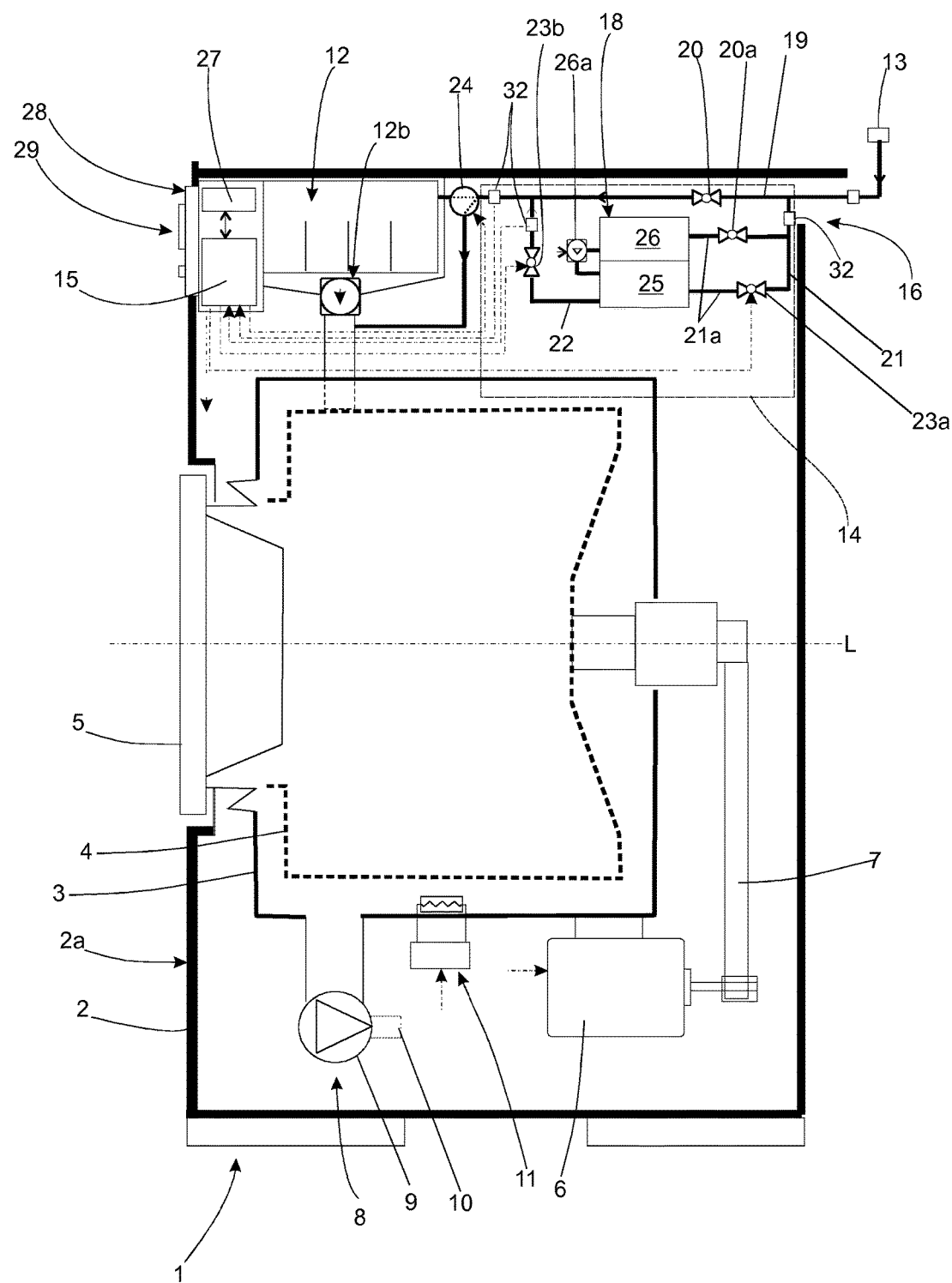
FIG. 2 is a longitudinal cross-sectional schematic view taken along line A-A in FIG. 1, with some parts/components of the machine removed for clarity.

With reference to FIGS. 1 and 2, reference number 1 indicates as a whole a home laundry washing machine which comprises: a preferably, though not necessarily, substantially parallelepiped-shaped, rigid outer boxlike casing 2, which is structured for resting on the floor; a preferably substantially cylindrical, bell-shaped hollow washing tub 3, which is arranged inside the casing 2 with its opening or mouth directly facing a laundry loading/unloading passthrough opening realized in the front wall 2a of boxlike casing 2; a preferably substantially cylindrical, elastically-deformable bellows (not shown) watertight connecting the front opening or mouth of washing tub 3 to the laundry loading/unloading opening realized in the front wall 2a of casing 2; and a substantially cylindrical, bell-shaped revolving perforated drum 4 structured for housing the laundry to be washed, and which is housed in axially rotating manner inside the washing tub 3 so as to be able to freely rotate about its longitudinal reference axis. In an alternative embodiment not shown, rotation axis may be vertical or inclined.

According to one embodiment, the revolving drum 4 is housed in axially rotating manner inside the washing tub 3 with its front opening directly faced/aligned to the laundry loading/unloading opening on the front wall 2a of casing 2, and the drum rotation axis is preferably arranged locally substantially coincident with the substantially horizontally-oriented longitudinal reference axis of washing tub 3.

Furthermore in the example shown, the hollow washing tub 3 is preferably suspended in floating manner inside the casing 2 via a suspension system preferably, though not necessarily, comprising a couple of upper coil springs (non illustrated) connecting the upper portion of the washing tub 3 to the top of the boxlike casing 2, and a couple of lower vibration dampers (not illustrated) connecting the bottom portion of the washing tub 3 to the bottom of the boxlike casing 2.

With reference to FIG. 1, the laundry washing machine 1 furthermore comprises a porthole door 5 which is hinged to the front wall 2a of casing 2 to rotate about a preferably, though not necessarily, vertically-oriented reference axis to and from a closing position in which the peripheral border of the porthole door 5 rests completely on front wall for closing the laundry loading/unloading opening and watertight sealing the washing tub 3; and an electrically-powered motor assembly 6 which is structured for driving into rotation the revolving drum 4 about its longitudinal reference axis inside the washing tub 3, by means of a belt/pulley system 7. In a different embodiment of the invention, the motor 6 may be directly associated with the shaft of the revolving drum 4.

With reference to FIG. 2, the laundry washing machine 1 furthermore comprises a water draining system 8 (only partially and schematically illustrated), which is configured to drain the wash water, i.e. dirty water and/or water mixed with washing and/or rinsing products, from the washing tub 3 to the outside. The water draining system 8 may comprise a draining pump 9 (schematically illustrated in FIG. 2), which is fluidly connected to a liquid outlet arranged on the bottom region of the washing tub 3 and is configured to drain the water from the washing tub 3 to supply the drained water into a draining suction pipe 10 (only partially illustrated in broken lines in FIG. 2).

As shown in FIG. 2, the laundry washing machine 1 furthermore comprises a heating device 11 configured to heat the water solution loaded in the washing tub 3 to a prefixed temperature. In accordance with one exemplary embodiment, the heating device 11 may comprise one or more electric resistors or any similar/equivalent heating electric/electronic components which are arranged, for example, in the bottom of the washing tub 3 and/or in a sump of the washing tub 3 in order to heat the water loaded in the washing tub 3.

In this instance, the washing tub 3, the drum 4, the suspension system, the electrically-powered motor assembly 6, the heating device 11, and the water draining system 8 of the laundry washing machine 1 are well-known elements provided in well-known laundry machine and detailed description thereof will be omitted accordingly.

Terminology which will be used as follows is hereinafter defined.

More specifically, "FH" is the unit of measurement of water hardness degree corresponding to French degree, wherein 1 fH=10 ppm CaCo3.

With the term fresh water, it will be understood a tap water provided by a water mains 13 usually arranged in a house. It should be understood that water mains 13 generally provides "hard water", i.e. water having a hardness degree greater than about 25 FH (250 ppm CaCo3).

With the term "softened water", it will be understood a water provided by a water softener system which will be disclosed in detail afterwards. In order to be effective for washing process the softened water may have an hardness degree lower than about 15 FH (150 ppm CaCo3), preferably lower than 5 FH (50 ppm CaCo3) and more preferably lower than 2 FH (20 ppm CaCo3). More preferably, according to a preferred embodiment, softened water may have a hardness degree lower than about 1 FH (10 ppm CaCo3).

With the term mix water, it will be understood a mixture of fresh water and softened water. Preferably, hardness degree of mix water may be comprised between about 15 and about 25 FH.

With "washing course", it will be understood a laundry washing cycle/program comprising a "main laundry wash phase", and one or more "secondary laundry wash phases" following the main laundry wash phase, wherein the secondary laundry wash phases may comprise one or more laundry rinse phases and preferably, although not necessarily, at least one laundry spin phase.

The main laundry wash phase may comprise, for example: a wetting phase (step of loading water and detergent into the washing tub), a maintenance phase (step of tumbling the laundry for detergent action) and preferably, although not necessarily, a spin phase (step of spinning the drum). If the course to be performed uses heated water, the main laundry wash phase can further comprise a heating phase (step of switching-on the heating device 11). The main laundry wash phase may further comprise a drain phase (step of draining water). It should be pointed out that drain phase is the last phase of the main laundry wash phase, and is performed before executing the first rinse phase of the secondary laundry wash phases following the main laundry wash phase.

Rinse phases following the main laundry wash phase, may comprise a water loading phase (loading water into the washing tub), a rinse maintenance phase (tumbling the laundry), a drain phase, and preferably a spin phase.

With "softened water laundry wash phase", it will be understood a laundry wash phase wherein softened water is supplied into the washing tub 3.

With "fresh water laundry wash phase" it will be understood a laundry wash phase wherein fresh water is supplied into the washing tub 3.

With "mix water laundry wash phase" it will be understood a laundry wash phase wherein mix water is supplied into the washing tub 3.

With "fresh water laundry washing course", it will be understood a laundry washing course wherein all the wash phases comprise the step of supplying fresh water into the washing tub 3.

With "softened water laundry washing course", it will be understood a laundry washing course wherein the main wash phase comprises the step of supplying softened water, and the secondary wash phase comprise the step of supplying softened or mix or fresh water.

With "detergent saving washing course", it will be understood a laundry washing course comprising the steps of supplying softened water during the main wash phase and preferably during one or more secondary laundry wash phases (rinse/spin phases) so as to perform corresponding "softened water laundry wash phase/s", in order to reduce the amount/quantity/dosage of detergent to be used, if compared with detergent amount used in a "fresh water washing course".

With the term "detergent" it will be understood any kind of laundry cleansing-agent which is supplied into the washing tub 3 during the main wash phase.

As shown in FIG. 2, the laundry washing machine 1 furthermore comprises a detergent dispensing assembly 12, which is housed inside the casing 2 in easily reachable manner by the user, and is structured to supply into the washing tub 3, detergent mixed with water. In one exemplary embodiment, the detergent dispensing assembly 12 may comprise a detergent drawer 12a (illustrated in FIGS. 1 and 2) which may be fitted/inserted in manually extractable manner into a completely recessed drawer housing (not illustrated), which extends substantially horizontally inside the boxlike casing 2, and is manually movable inside the drawer housing between a working position (illustrated in FIG. 1) and an extracted position (not illustrated). It should be understood that detergent dispensing assembly 12 may be structured for selectively spilling/pouring a given amount of fresh water arriving from a fresh water mains 13 directly into the detergent drawer 12a, so as to flush the detergent, out of the same detergent drawer 12a so that detergent mixed with water is loaded into the washing tub 3.

According to an embodiment the detergent dispensing assembly 12 may have a single-dose structure and is structured to supply into the washing tub 3 a dosage of detergent previously loaded by the user into the detergent drawer 12a.

However, it should be understood that according to a different embodiment, the detergent dispensing assembly 12 may have an auto-dosing system/structure. i.e. it is provided with an auto-dosing detergent device 12b designed to automatically control the amount of detergent supplied to into the washing tub 3. The auto-dosing detergent device 12b may comprise for example one or more detergent metering pumps (not illustrated), i.e. volumetric pumps for the metered feed of the detergent/water into the washing tub 3 based on control signals.

The laundry washing machine 1 furthermore comprises a water softener system 14, which is arranged inside the casing 2 between the water mains 13 and the detergent dispensing assembly 12, or between the water mains 13 and directly the washing tub 3, and is designed to reduce the hardness degree of the fresh water so as to provide softened water to the detergent dispensing assembly 12 or directly to the washing tub 3.

According to one simplified embodiment, the water softener system 14 may be structured to be activated/controlled so as to operate between a first operating state, wherein it provide softened water, and a second operating state, wherein it provides fresh water. It should be understood however that other kind of water softener systems may be contemplated. As can be appreciated, the present invention can be conveniently applied to a water softener system 14 which may be activated/controlled so as to selectively operate, in addition to the first and second operating states above disclosed, further in a third state wherein it provides mix water.

According to a simplified embodiment, the water softener system 14 may be designed to vary the hardness degree of the softened water and/or mix water, based on received control/command signals.

With regard to an exemplary embodiment illustrated in FIG. 2, the water softener system 14 may comprise a fresh water supply circuit 16, which is arranged inside the casing 2 between the water mains 13 and the detergent dispensing assembly 12 or between the water mains 13 and directly the washing tub 3, and may be structured so as to control/regulate the flow of fresh water from the water mains 13 towards the detergent dispensing assembly 12 and/or the washing tub 3. In accordance to the exemplary embodiment illustrated in FIG. 2, the machine 1 may preferably although not necessarily comprise an electric controlled flow diverter device 24 which is connected between the water softener system 14 and the detergent dispensing assembly 12/the washing tub 3, and is designed to receive fresh or softened or mix water from the water softener system 14 and selectively supply, on command, the received water to the detergent dispensing assembly 12 or the washing tub 3.

However, it should be understood that according to different embodiments, the water softener system 14 may comprise any other known device/system designed to selectively supply the received water to the detergent dispensing assembly 12 or the washing tub 3.

In accordance with one embodiment, the water softener system 14 further comprise an internal water softening device 18, which may be arranged along the fresh water supply circuit 16 between the water mains 13 and the detergent dispensing assembly 12, or the flow diverter device 24 if presents, so as to be crossed by the fresh water flowing from the water mains 13 towards the detergent dispensing assembly 12 or directly towards the washing tub 3, and is structured to reduce the hardness degree of the fresh water drawn from the water mains 13 so as to provide the softened water to be channeled to the detergent dispensing assembly 12 or directly to the washing tub 3.

In accordance with one simplified exemplary embodiment shown in FIG. 2, the fresh water supply circuit 16 may preferably comprise a hosepipe 19 connecting the water mains 13 to the inlet of the detergent dispensing assembly 12 or to the washing tub 3, an electrically-controlled valve 20 which is arranged along the hosepipe 19 and is able to control/regulate the flow of fresh water from the water mains 13 towards the detergent dispensing assembly 12 or to the washing tub 3; a hosepipe 21 connecting the water mains 13 to the inlet of water softening device 18 which in turn has the outlet connected to the hosepipe 19 or directly to the detergent dispensing assembly 12 by means of a hosepipe 22; an electrically-controlled valve 23a, which is arranged along the hosepipe 21 and is designed to control/regulate the flow of fresh water from the water mains 13 towards the inlet of the water softening device 18 based on a control signal in order to cause the water softening device 18 to regulate/reduce the hardness degree of the softened water provided in its outlet; and preferably although not necessarily, an electrically-controlled valve 23b, which may be arranged along the hosepipe 22 and is designed to control/regulate the flow of softened water from the water softening device 18 towards the hosepipe 19. It should be understood that mix water may be provided for example by controlling the electrically-controlled valve 20 and 23b.

The electrically-controlled valves 20 and/or 23a and/or 23b may be on-off electric valves configured to be selectively controlled/activated so as to cause the softened, fresh or mix water to be selectively supplied to the detergent dispensing assembly 12/washing tub 3. It should be understood that electrically-controlled valves 20 and/or 23a and/or 23b may be controlled to selectively regulate the volume (liters) of fresh water crossing the hosepipe 19, and/or crossing the softening device 18 and/or the volume of water that the water softening device 18 provides to the hose 19 in order to mix the fresh water and softened water so as to provide mix water having a determined hardness degree.

The electrically-controlled valves 20 and/or 23a and/or 23b could be controlled so that the hardness degree of the softened or mix water is regulated based on a required value. It should in any case be understood that control of the hardness degree of the water may be not limited to the circuit above disclosed. For example the electrically-controlled valve 20, 23a, 23b may be not limited to on-off electric valves but according to possible different embodiments of the present invention, the electrically-controlled valve 20, 23a, 23b may be proportional valve or other kind of known valve electrically designed to be controlled to regulate a water flow rate.

In accordance with one embodiment shown in FIG. 2, the laundry washing machine 1 may preferably, although not necessarily, comprise an electronic sensing system 32, which may comprise a number of sensor devices arranged along the hosepipes 19, 21, 22 to determine/measure hardness values which are indicative of the hardness degree of: the fresh water provided from the water mains 13 and/or the softened water provided in outlet by the water softening device 18, and/or the fresh/softened/mix water provided by the water softening system 14.

In accordance with the exemplary embodiment shown in FIG. 2, the sensor devices may be conductometric sensors arranged along the hosepipes 19, 21, 22 upstream from the detergent dispensing assembly 12.

According to an embodiment shown in FIG. 2, the water softening device 18 may be a ion-removal device type. In accordance with one exemplary embodiment, the water softening device 18 may comprise a water-softening agent container 25, which is filled with a given amount of ion-exchange resins (not shown) capable to restrain the calcium and/or magnesium ions (Ca++ an Mg++) dissolved in the fresh water flowing across the water-softening agent container 25 and is preferably interposed between the hosepipes 21 and 22 to be crossed by the fresh water flowing from the valve 23a and the hosepipe 21. In accordance with one exemplary embodiment, the water softening device 18 may further comprise a regeneration-agent reservoir 26 which to structured for receiving a given amount (for example half a Kilo or one Kilo) of salt grains (Sodium Chloride) and is designed to uses brine (i.e. salt water) to periodically regenerate the ion-exchange resins contained in the water-softening agent container 25. Salt water, in fact, is able to remove from the ion-exchange resins the calcium and magnesium ions previously combined/fixed to the resins.

The internal water softening device 18 may further preferably although not necessarily comprise: a water supply circuit 21a which is structured for selectively channeling, on command, a given amount of fresh water into the water-softening agent container 25 and regeneration-agent reservoir 26 so to at least partly dissolve the salt or other regeneration agents stored therein and form a given amount of brine (i.e. salt water); and a electrically-controlled valve 20a which is arranged along a hosepipe of the water supply circuit 21a and is designed to control/regulate the flow of fresh water from the water mains 13 towards regeneration-agent reservoir 26, an electrically-powered brine-circulating pump 26a which is interposed between the water-softening agent container 25 and the regeneration-agent reservoir 26 and is structured for transferring/moving the brine (i.e. the salt water) from the regeneration-agent reservoir 26 to the water-softening agent container 25 when activated.

Ion-removal internal water softening devices are disclosed, for example, in reference documents WO 2006 079 417 and/or EP 0 861 114 wherein a ion-removal internal water softening device comprised a flow through capacitor which comprises plates having a conductive surface. The plates are chargeable in response to an applied DC potential. The plates are separated from each other by non-conductive spacers. The plates and the conductive surface on the plates may be constructed from conductive materials such as metals, carbon or conductive polymers or combinations. Because the plates of the flow through capacitor have a limited capacity, the flow through capacitor requires regeneration, to remove the hardness ions from the flow through capacitor plates. The flow through capacitor may be regenerated by flushing with fresh water, short-circuiting the anode plates with the cathode plates or by reversing the polarity or by a combination thereof. The interval for regeneration is also dependent on the concentration of ions in the feed water; the harder the feed water, the more frequent regeneration is required. The water produced during regeneration contains a high level of hardness (ions) and is therefore directed to a waste outlet. The flow through capacitor thereby provides water softening without the addition of chemicals for regeneration.

It should in any case be understood that water softening device 18 is not limited only to ion-removal devices type, but according to other possible embodiments of the present invention, it may comprise any kind of device/apparatus operating according to known water softening technologies. In accordance with an exemplary embodiment (not illustrated), the water softening device 18 may comprise: reverse osmosis systems/devices, nano-filtration systems/devices, distillation systems/devices such as membrane distillation systems/devices, boiling systems/devices, capacitive deionization systems/devices, electro-dialysis systems/devices and similar which are known and detailed description thereof will be omitted accordingly.

As illustrated in FIGS. 1, 2, 3, 5, 7 10-12, the laundry washing machine 1 may further comprise a user control panel 28, which may be preferably, although not necessarily arranged in the front wall 2a of the casing 2 and is structured/configured to allow the user to input information being indicative of an detergent saving washing course to be performed. The user control panel 28 may preferably comprise, for example, a LED or LCD or fluorescent type display or the like, and/or preferably acoustic devices designed to generate vocal/acoustic messages.

As illustrated in FIG. 2 the laundry washing machine 1 may further comprise an electronic control unit 15 which may be electrically connected to the control panel 28 in order to receive the information inputted by the user, and is configured to provide detergent information based on softened water laundry washing phase/s of said laundry washing course to be performed.

Figure 10:
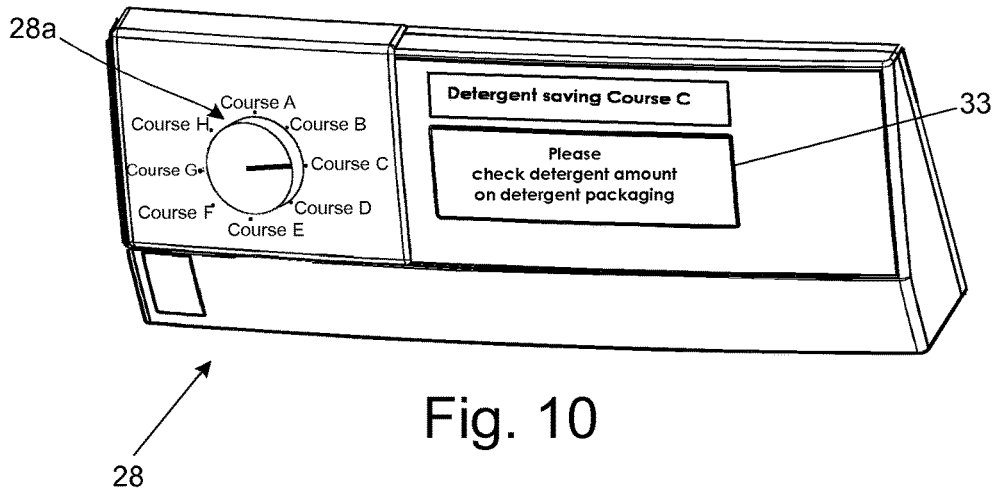
FIGS. 10, 11, and 12 schematically illustrates as much examples of messages provided by the user control panel of the laundry washing machine illustrated in FIG. 1.

In accordance with an embodiment, electronic control unit 15 is configured to advise user by said control panel 28 with one or more messages containing data which may assist the user in determining the detergent saving amount QSi to be used in performing said laundry washing course. According to examples illustrated in FIG. 10-12, the electronic control unit 15 may be configured to automatically generate a message by the control panel 28 warning/asking the user to load an amount of detergent suggested by detergent-instruction present on the detergent packaging, based on the softened water to be used during the washing laundry phases. FIG. 10 illustrates for example a possible message provided by the control panel 28 to assists the user: "Detergent saving washing course—please check detergent amount on detergent packaging!"

It should be understood that in addition, or alternately to the illustrated message, other simple messages could be generated such as, for example (FIG. 11), "Please use a reduced detergent saving amount !" or "Please reduce X % of detergent" or any other similar messages.

For example detergent packaging may indicate: using the nominal dose QN=130 ml of detergent for water having hardness greater than 15 FH; and using the reduced amount of detergent QSi=QNi— (25% QNi), i.e. 97 ml for water having hardness lower than 15 FH.

In accordance with an embodiment the message may also preferably comprise additional detergent information that advantageously aid user to calculate the reduced detergent saving amount, such as the hardness degree/s of the softened/mix water, and/or the washing laundry phases of the course using the softened water/mix water/fresh water. In this respect, the detergent packaging may comprise tables containing detergent saving amounts associated with: respective washing course and/or hardness degree of the water, and/or kind of water used during any phase of a course (mix/fresh/softened water), and/or washing temperature, and/or kind of fabric.

According to a preferred embodiment, electronic control unit 15 may be configured to determine the detergent saving amount QSi to be loaded in the detergent dispensing assembly 12 and/or to be supplied into the washing tub 3 based on the softened water laundry washing phase/s of the laundry washing course to be performed and warning the user by means of the control panel 28 with a message containing the determined detergent saving amount QSi. Electronic control unit 15 may be configured to determine the detergent saving amount QSi to be loaded in the detergent dispensing assembly 12, and/or the detergent saving amount QSi to be automatically supplied into the washing tub 3 by the auto-dosing device 12b if present, based on the softened water laundry washing phase/s of the laundry washing course to be performed. For example the illustrated message could be, for example (FIG. 12, "Please load "QSi" into the detergent dispensing assembly 12, or any other similar messages.

According to a preferred embodiment, the electronic control unit 15 may be further configured to control the auto-dosing device 12b, by control signals, in order to automatically supply during the main wash phase, the determined detergent saving amount QSi to the washing tub 3.

In accordance with a first embodiment shown in FIG. 3, the control panel 28 may be structured/configured to allow the user to select a laundry washing course among one or more of preset detergent saving laundry washing courses, i.e. detergent saving cotton course, detergent saving synthetic course, detergent saving delicates wool course. Data relating to selectable/performable detergent saving laundry washing course/s may be preferably contained in a memory device 27 or any similar apparatus cooperating with the electronic control unit 15, and may comprise information associated with the detergent saving amount QSi to be loaded/used when detergent saving washing courses are performed. Memorized data relating to selectable/performable detergent saving washing course/s may further comprise information about the kind of water (softened/fresh/mix), and/or hardness degree of the water to be supplied during each laundry washing phases of a detergent saving washing course. For example, memorized data relating to a selectable detergent saving cotton course may comprise: the detergent saving amount QSi, information about the saved amount of detergent ΔQSi, information that the main wash phase is a softened water washing phase, information that the first rinse phase corresponds to a softened water washing phase, information that second rinse phase corresponds to a mix water washing phase, and information that final rinse phase corresponds to a fresh water washing phase.

It should be understood that saved amount of detergent ΔQSi may be determined for example by calculating the difference between the detergent saving amount QSi and a nominal amount of detergent QNi, wherein the latter may correspond to an amount of detergent generally used in performing similar fresh-water washing course, or a medium value generally indicated in the detergent packaging.

FIG. 4 illustrates a table which contains on a column a number of detergent-saving washing courses, detergent saving washing course A, B, . . . , N which could be implemented by the machine 1. For each detergent saving washing course, the table contains information relating to a detergent saving amount QS1, QS2, . . . , QSN, the saved amount of detergent ΔQS1, ΔQS2, . . . ΔQSN and the kind of water, i.e. softened, mix, fresh water to be supplied during each laundry washing phase.

As shown in FIG. 4, detergent saving washing courses may be preferably configured so that: during the main wash phase, the softener system 14 is activated/controlled in the first operating state in order to provide/supply a softened water so as to perform a softened water washing phase, whereas during the secondary washing phase following the main wash phase i.e. the rinses phases and preferably the spin phase, the softener system 14 is controlled in order to selectively operate in the first or second or third state so as to provide softened, or fresh or mix water, respectively, in order to perform softened water washing phase, or fresh water washing phase and the mix water washing phase. Preferably one or more performable detergent saving washing courses may be programmed so that the first rinse phase is a softened water washing phase, whereas other performable detergent saving washing courses may be programmed so that the last rinse phase is a fresh water washing phase.

Preferably, one performable detergent saving washing course may be programmed so that all the laundry wash phases, e.g. the main wash phase and secondary laundry wash phases, correspond to softened water wash phases, wherein the dose of detergent to be loaded corresponds to the detergent saving amount QSi.

Figure 5:
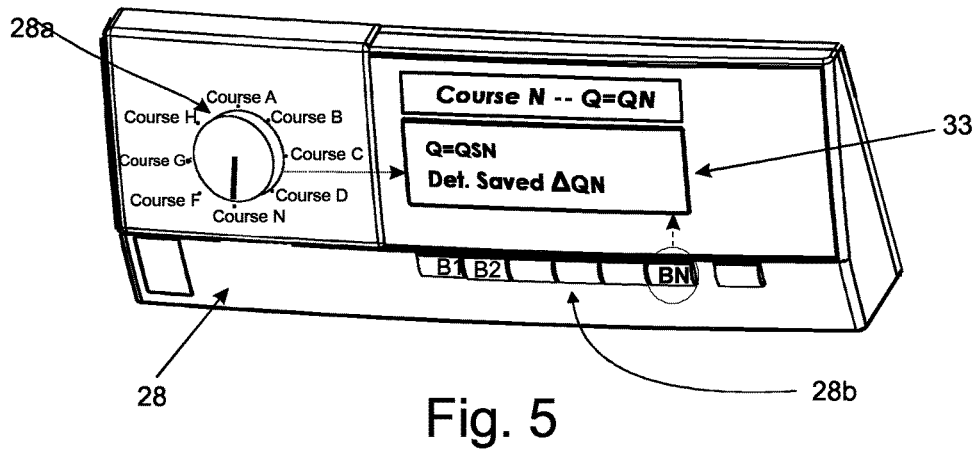
FIG. 5 schematically illustrates a second embodiment of a user control panel of the laundry washing machine illustrated in FIG. 1.

In accordance with a different embodiment shown in FIG. 5, the washing machine 1 may be provided with a control panel 28 structured/configured to allow the user to input first information indicative of a fresh water washing course to be performed, and second information indicative of one or more detergent saving command, and the electronic control unit 15 is configured to determine/set the detergent saving washing course based on received first and second information.

The control panel 28 may be configured to allow operator to input said second information indicative of one or more detergent saving commands associated to respective detergent saving levels, whereas the electronic control unit 15 is configured to set/determine the detergent saving laundry washing course based on the selected fresh water laundry washing course and said detergent saving commands, and determine the detergent saving amount QSi by reducing a nominal amount of detergent QNi on the basis on the detergent saving commands.

In accordance with the exemplary embodiment shown in FIG. 5, the control panel 28 may comprise a first select part 28a configured to allow the user to select a fresh water washing course among one or more fresh water washing courses; and a second select part 28b is configured to allow the user to input one or more detergent saving commands corresponding to detergent saving states/levels that electronic control unit 15 may apply to the selected fresh water washing course.

The information associated with the fresh water washing courses selected by the first select part 28a may be contained in form of data memorized in the memory device 27. According to this embodiment, memorized data associated to a fresh water washing course may comprise information relating to the predetermined/nominal amount of detergent QNi to be used when the fresh water washing course is performed.

According to the embodiment illustrated in FIG. 5, the electronic control unit 15 may be configured to determine/set the detergent-saving washing course to perform, based on the first information indicating the selected fresh water washing course and the second information relating to the selected detergent saving level that user has selected/requested.

Preferably, the electronic control unit 15 may set/determine the detergent saving laundry washing course by switching/replacing one or more fresh water washing phases of said selected fresh water laundry washing course, with one or more softened water laundry washing phases and/or mix water laundry washing phases, based on said detergent saving commands.

In accordance with the second exemplary embodiment shown in FIG. 5, the electronic control unit 15 may be further configured to determine the detergent-saving washing course to be performed by reducing the nominal/predetermined amount of detergent QNi (associated to the fresh-water washing course) to an detergent saving amount QSi, based on the kind of water (softened or mix or fresh) to be supplied during the washing phases and provide the user with the detergent saving amount QSi and preferably with information about detergent which may be saved ΔQSi (ΔQSi=QNi-QSi) before starting the detergent saving course.

In usage, during the detergent saving washing course, the electronic control unit 15 activates/controls the water softening system 14 (depending on the kind of softening system 14 presents on the machine 1) based on the set detergent saving washing course to cause softened water to be supplied during the main wash phase and/or one or more secondary laundry washing phase/s of the fresh water washing course. Preferably, the electronic control unit 15 may control auto-dosing device 12*b* in order to automatically feed the determined detergent-saving amount QS into the washing tub 3 during the main wash phase.

In this respect it should be understood that Applicant has found that by using the water softener system 14 in the machine 1 so as to perform only softened laundry wash phases during a washing course, it is possible to reduce of 25% the amount of detergent compared to a machine 1 using only fresh water having a hardness of about 25 FH degree during a same washing course.

Applicant has further found that by using the water softener system 14 in the machine 1 so as to perform only softened laundry wash phases during a washing course, it is possible to reduce of 50% the amount of detergent compared to a machine 1 using only fresh water having a hardness greater than 25 FH degree during a same washing course.

As shown in the example of FIG. 5, the first select part 28*a* may comprise a rotation knob for supplying the selected signal containing the first information after sensing whether a course is selected through rotation, whereas the second select part 28*b* may comprise one or more buttons B1,BN for supplying the selected signal containing the second information after sensing whether a detergent command/level has been selected. It should in any case be understood that the first select part 28*a* and second select part 28*b* are not limited to the example illustrated in FIG. 5, but could comprise other kind of known input devices such as, for example, a touch panel's.

Figure 6:
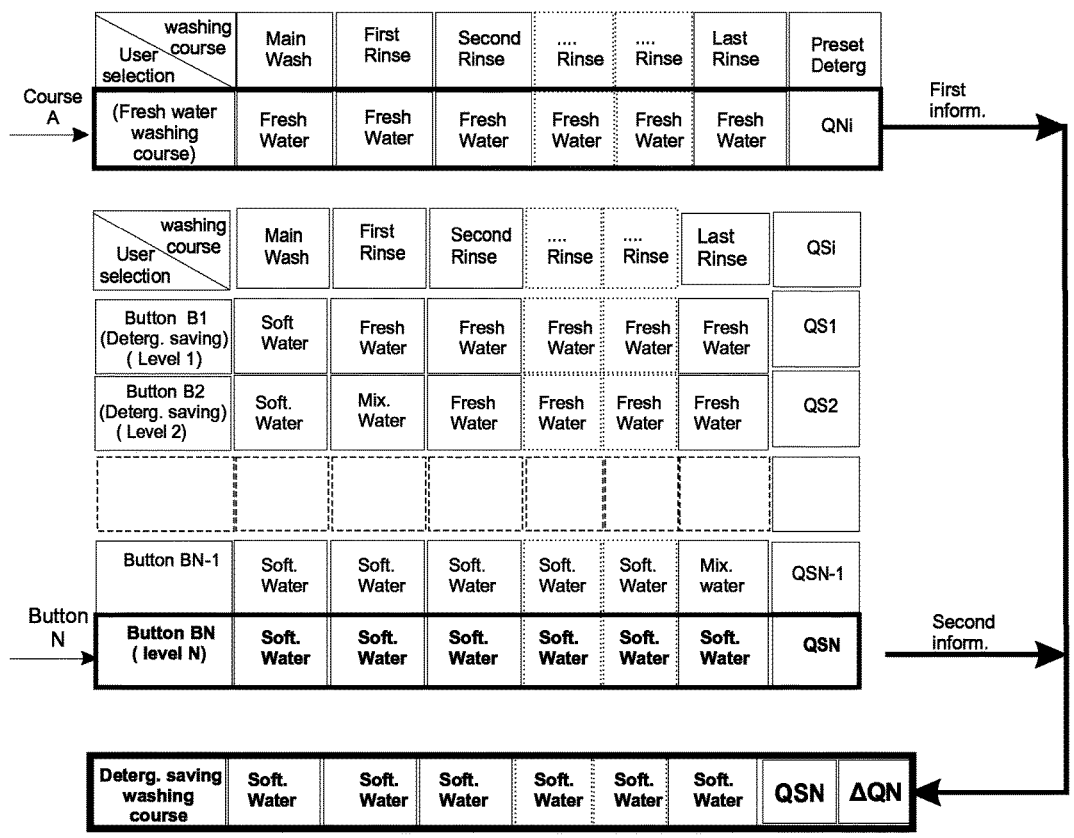
FIG. 6 shows an example of a table containing detergent saving washing courses selectable by the control panel illustrated in FIG. 5.

In the example shown in FIGS. 5 and 6, if the buttons B1, BN are not pushed, the electronic control unit 15 may set the "standard" fresh-water washing course so as to load the fresh water during all the washing phases and preferably display the predetermined amount QNi.

When one or more buttons B1, BN is/are pushed, the electronic control unit 15 modifies the fresh water washing course in the "detergent-saving washing course" by changing/switching/replacing the kind of water to be supplied during the washing phases. Kind of water (mix or soft or fresh) to be supplied during the washing phases, may be determined by the electronic control unit 15 on the basis of the pushed buttons B1, . . . , BN.

For example, button B1 when pushed may cause the softened water to be supplied during the main wash phase and the predetermined detergent amount QN1 to be reduced to the detergent saving amount QS1; the button B2 when pushed may cause the softened water to be supplied during the first rinse, and the button BN, when pushed may cause the softened water to be supplied during the last rinse.

It should be understood that the second select part 28*b* may be configured to allow the user to select the kind of water, i.e. fresh or softened or mix, to be supplied during the washing phases. For example, buttons B1, . . . , BN may be structured so that user may select the soft/fresh/mix based on a pushed time and/or number of repeatedly pushing of a button.

It should in any case be understood that buttons of the second select part 28*b* may be configured to cooperate with the electronic control unit 15 in order to allow the user to select any combination of loading of the softened water in the washing phases of the detergent saving washing course.

For example, according to an embodiment the buttons may be configured so that pushing of the button Bi may cause loading of the softened water during all laundry washing phases of washing course comprised between the first treating phase and the i-th treating phase. For example, user may conveniently select a fresh water washing course to be performed, for example a cotton cycle, or delicate cycle, wool cycle, and pushes a button to select the detergent saving function in order to cause the selected fresh washing course to be performed as a detergent saving course.

Figure 7:
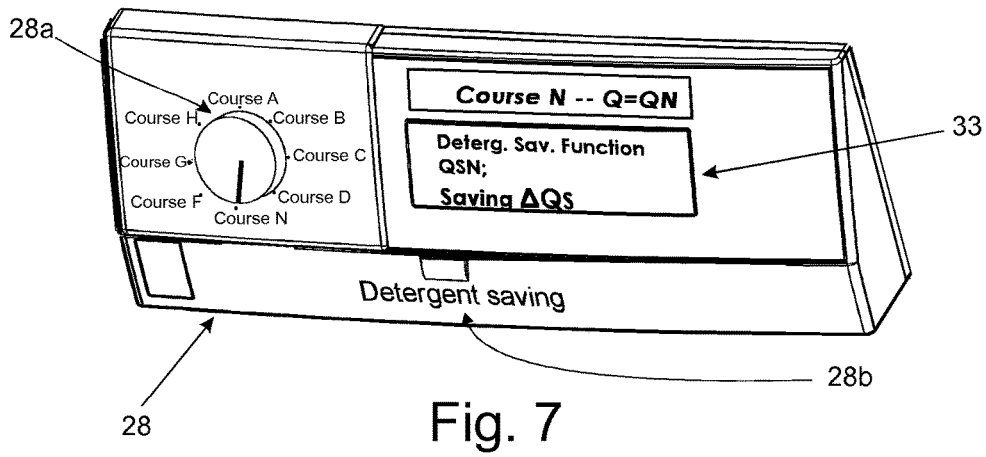
FIG. 7 schematically illustrates a third embodiment of a user control panel of the laundry washing machine illustrated in FIG. 1.
Figure 8:
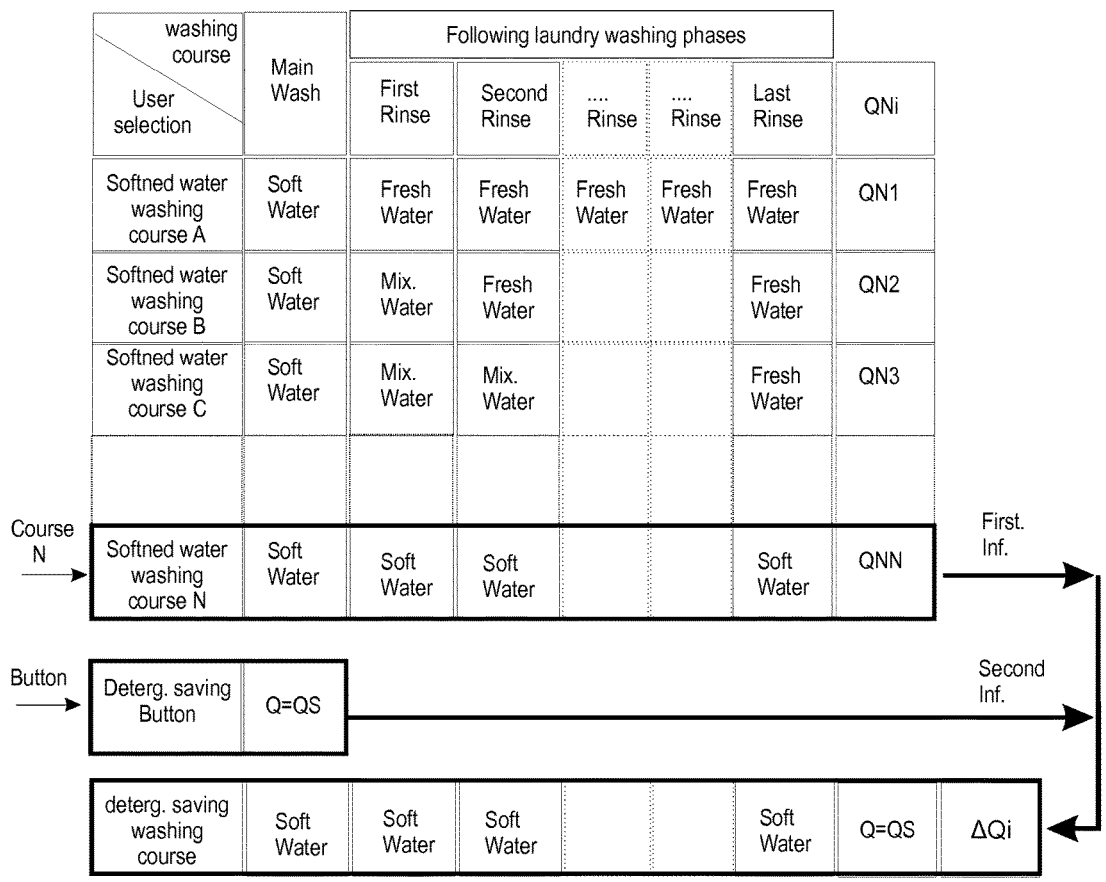
FIG. 8 shows an example of a table containing detergent saving washing courses selectable by the control panel illustrated in FIG. 7.

FIGS. 7 and 8 illustrate a third exemplary embodiment which differs from the second embodiment because the first select part 28*a* is configured to allow the user to select a laundry washing course among a plurality of softened water washing courses, and the second select part 28*b* is configured to allow the user to select a detergent saving command/function.

Information about softened water washing courses may be contained in memory device 27 and comprise data relating to kind of water (softened, mix and fresh water) to be supplied during the washing phases, a value indicating a predetermined nominal amount of detergent QNi, and a detergent saving amount QSi having a value lower than the amount QNi.

The electronic control unit 15 may be configured to set the detergent saving washing course based on the first information indicating the selected softened water washing course and the second information relating to the detergent saving command/function that user has requested, and determine the amount of detergent based on the information inputted by the second select part 28*b*.

Preferably, the detergent saving course set by the electronic control unit 15 comprises substantially the softened laundry washing phases of the selected softened water washing course, and the detergent saving washing amount QSi is lower than the predetermined detergent amount QNi associated to the softened water washing course.

In a exemplary embodiment, the electronic control unit 15 may be configured to set a detergent saving washing course having, on the one hand, the same hardness degree/kind of the water during the washing phases as the softened water washing course and, on the other hand, determine/display the amount of detergent reduced from the predetermined amount of detergent QNi (associated to the softened water washing course) to the detergent saving amount QSi.

As shown in the example of FIGS. 3 and 7, the first select part 28*a* may comprise a rotation knob, whereas the second select part 28*b* may comprise at least one button for supplying the selected signal containing the second information, i.e. detergent saving command/function. In the example shown in FIGS. 7 and 8, if the button is not pushed, the electronic control unit 15 may perform the softened water washing course selected by user, so as to load the softened water during the prefixed laundry washing phases and display and/or control supplying of the predetermined amount of detergent QNi.

On the contrary, when the buttons is pushed, the electronic control unit 15 modifies the softened water washing course so as to define the "detergent saving washing course" to be performed, display and/or control supplying of the detergent saving amount QSi, control the water softening system 14 so as to supply softened water during the main wash phase, and in order to selectively supply mix or softened or fresh water during the following rinse phase/s.

According to a preferred embodiment illustrated in the Figures, the electronic control unit 15 may be configured to provide the user via the control panel 28 an indication of said predetermined detergent amount QNi, and/or an indication of the detergent saving amount QSi, and/or an indication of the difference ΔQi between the predetermined washing detergent QNi and said detergent saving amount QSi. The electronic control unit 15 may be further configured to provide the user via the control panel 28, i.e. by means of LED or LCD or fluorescent type display information associated with the detergent saved amount ΔQi and/or with the consumed detergent. For example, display may shows the detergent saved amount information in a numeric format or graphic format, i.e. histograms or icons or similar.

Figure 9:
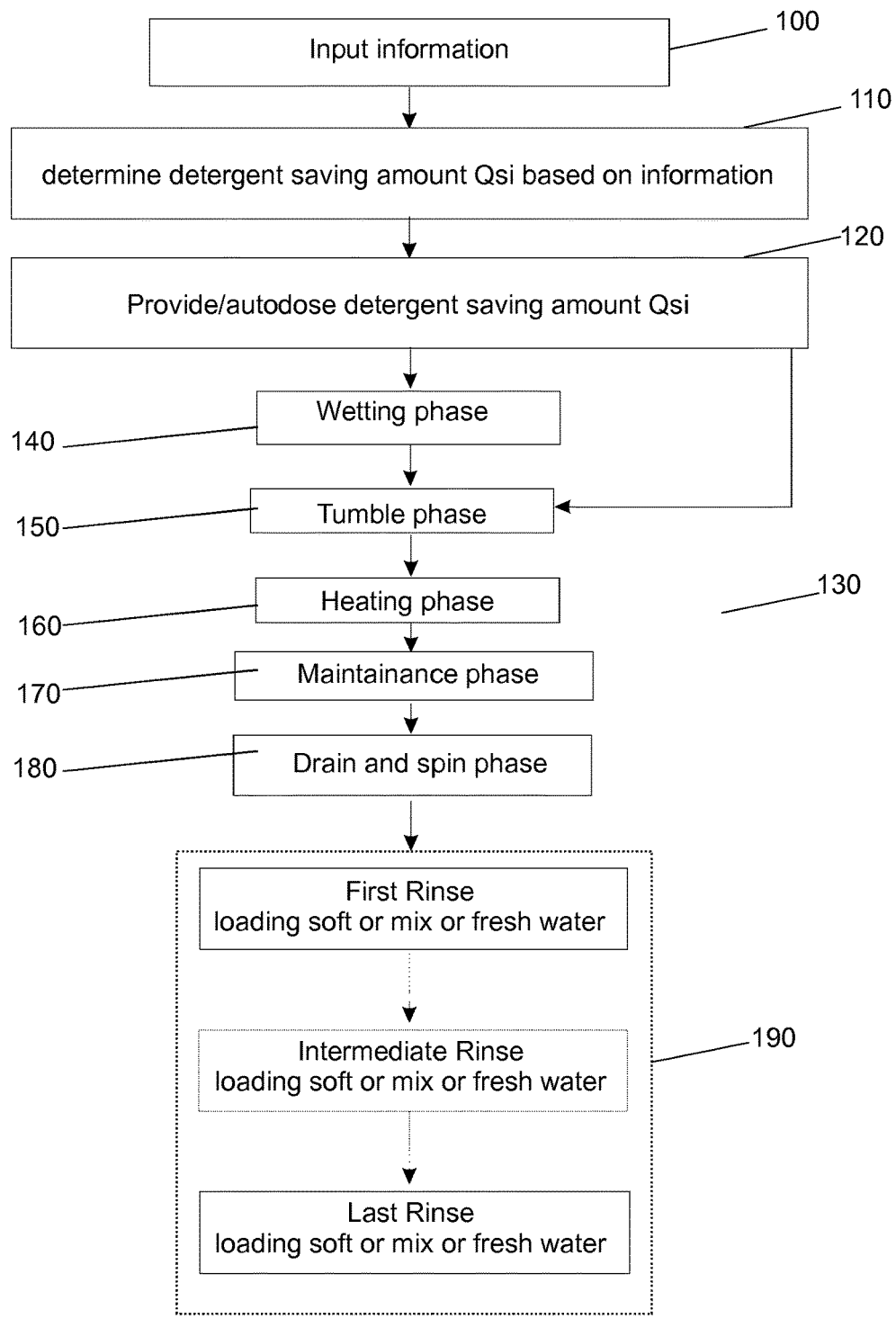
FIG. 9 is a flow chart containing the operation performed by the laundry washing machine of aspects of the present invention.

Next, the operation performed by laundry washing machine 1 according to aspects of the present invention will be explained in FIG. 9 which illustrates an outline operation flow chart.

In step 100, user inputs via the control panel 28 the information indicative of the detergent saving washing course to be performed. As above disclosed, in this step user could select directly the detergent saving washing course among one or more washing courses as illustrated in the example of FIGS. 1 and 3, or inputs the first and second information as illustrated in the second embodiment illustrated in FIG. 5 or the third embodiment illustrated in FIG. 7.

The electronic control unit 15 determines in the memory device 27 all data/information about the kind of water (softened or mix or fresh water) and/or the prefixed hardness of the water, to be supplied during each laundry washing phase, i.e. main wash phase and the rinse phases of the selected laundry washing course, based on the set detergent saving washing course.

After that, in step 110 the electronic control unit 15 determines the detergent saving amount QSi based on the detergent saving washing course to be performed and, in step 120, provides the user with the information relating the detergent saving amount QSi.

Figure 11:
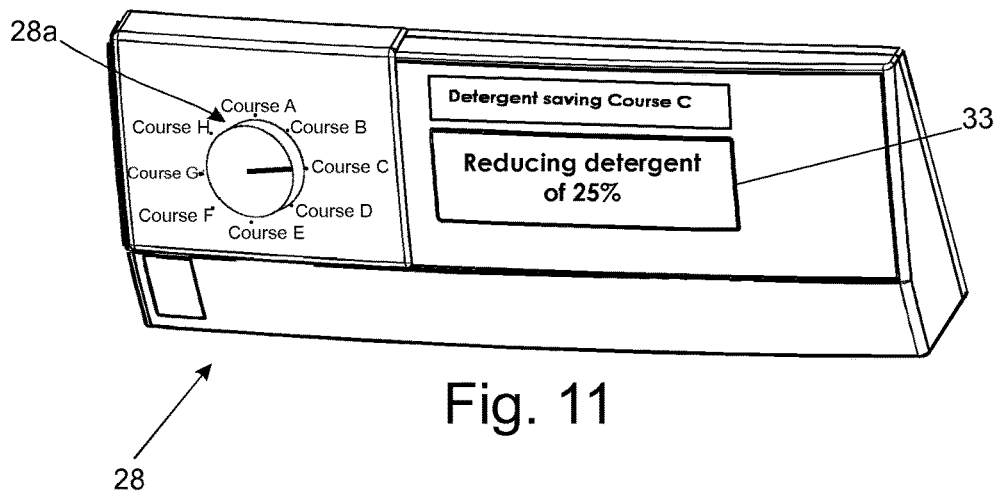
Figure 12:
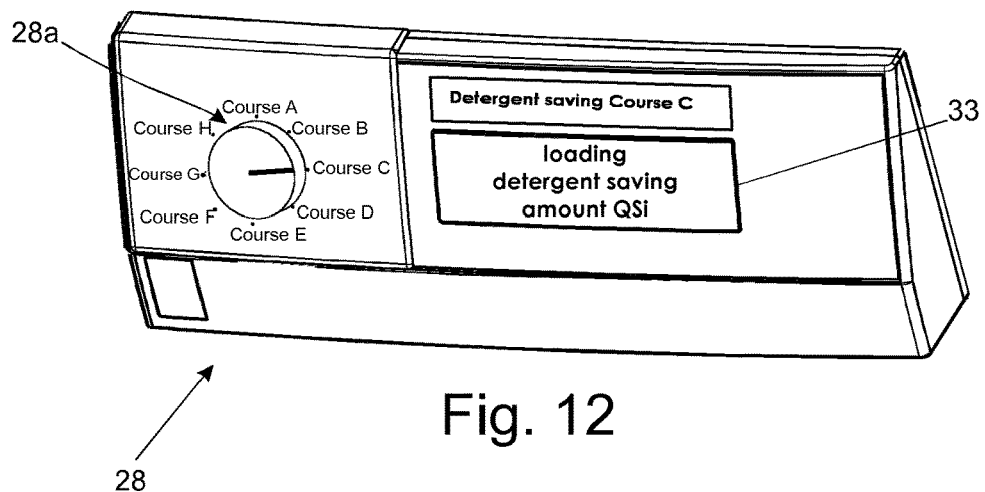

It should be understood that according to a different embodiment in step 120, electronic control unit 15 may provide a message to the user containing information associated with the detergent saving amount as illustrated, for example, in FIG. 10-12.

After that, in step 130, electronic control unit 15 may start performing the main wash phase of the detergent saving washing course. Hereinafter, it will be supposed that user has selected a detergent saving washing course, wherein the main wash phase is performed by using softened water, and the secondary wash phases using softened water.

During the wetting step (step 140) of the main wash phase, the electronic control unit 15 activates/controls the softener system 14 so as to supply softened water into the detergent dispensing system 12 to cause the detergent to be flushed from the detergent dispensing system 12 into the washing tub 3. At this time, the electronic control unit 15 may preferably although not necessarily control the valves 20, and/or 23a and/or 23b so as to selectively regulate flows/volumes of fresh water crossing the hosepipes 19, 21 and 22 and passing through the water softening agent container 25, based on the amount of softened water to be supplied and/or the hardness degree of the softened water.

Preferably although not necessarily, if the laundry washing machine 1 comprises an electronic sensing system 32, the electronic control unit 15 may control the valves 20, and/or 23a and/or 23b based on a comparison between the prefixed hardness degree and the measured water hardness degree. Of course, if the auto-dosing device 12b is present, the electronic control unit 15 may control the auto-dosing device 12b to automatically supply the detergent saving amount QSi into the washing tub 3. In one embodiment, main wash phase may comprise a drum tumbling step, wherein electronic control unit 15 controls the electric motor assembly 6 so as to rotate the drum 4 such that the laundry is tumbled/wetted and detergent is dissolved in the softened water loaded in the tub 3 (step 150). In this step, the electronic control unit 15 may further control the softener system 14 in order to supply softened water directly to the washing tub 3 until a prefixed water level is reached. In one embodiment electronic control unit 15 could control the flow diverter, if present, to supply softened water directly to the washing tub 3.

After the prefixed water level is reached, the electronic control unit 15 may continue to control the rotation of the drum 4 to perform the tumbling movements of the laundry inside of the drum 4 and preferably starts heating step wherein it preferably controls the heating device 11 (step 160).

Next, in step 170, the electronic control unit 15 preferably switches off the heating device 11 if the latter is on, and starts performing a maintenance phase wherein the rotation of drum 4 is controlled in order to perform the tumbling movements of the laundry inside of the drum 4.

Next, in step 180, the main wash phase, performs drain and preferably, although not necessarily spin steps. In the drain step, the electronic control unit 15 controls the water draining system 8 to drain the washing water from the washing tub 3, whereas in the spin step the electronic control unit 15 preferably controls the motor assembly 6 so as to spin the drum 4 at high speed one or more times.

After performing the drain and spin steps, in step 190, the electronic control unit 15 performs a prefixed number of rinse phases during which the electronic control unit 15 may activate/control the water softener system 14 in order to selectively supply softened, or mix, or fresh water to the washing tub 3 according to the selected detergent saving washing course. Therefore when it is required high level of detergent saving, the electronic control unit 15 may activate/control the softener system 14 to supply softened water in any rinse phase (Button BN/top level in the table illustrated in FIG. 4), whereas on the contrary, if a low level of detergent-saving is required (level 1 in the table illustrated in FIG. 4), the electronic control unit 15 may control the softener system 14 to supply mix or fresh water during the rinse phases. In accordance with one embodiment, rinse phases performed after the main wash phase may comprise the step to selectively supplying a soft or mix or fresh water to the washing tub 3 preferably, although not necessarily, through a main wash compartment (not illustrated) of the detergent dispensing assembly 12. The first rinse phase may also comprise a rinse maintenance step, wherein the electronic control unit 15 controls the motor assembly 6 in order to rotate the drum 4 so that the laundry is tumbled inside the drum 4, and a drain and spin step wherein the rinse water is removed from the laundry.

It has thus been shown that the present invention allows all the set objectives to be achieved.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A laundry washing machine, comprising:
an outer casing;
a washing tub, which is arranged inside the casing;
a rotatable drum, which is arranged in an axially rotating manner inside the washing tub and is designed to receive laundry to be washed;
a detergent dispensing assembly designed for supplying laundry detergent into the washing tub;
a water softening system designed to receive fresh water from a water mains and reduce a hardness degree of the fresh water to supply softened water to the detergent dispensing assembly and/or to the washing tub during one or more softened water laundry washing phases;
a control panel configured to allow an operator to input information associated with a laundry washing course to be performed, wherein said laundry washing course comprises one or more of the softened water laundry washing phases; and
a controller configured to provide detergent information based on the softened water laundry washing phases of the laundry washing course to be performed,
wherein the control panel comprises:
a first select part configured to allow the operator to input first information indicative of a laundry washing course; and
a second select part configured to allow the operator to input second information indicative of one or more detergent saving commands;
wherein the controller is configured to set a detergent saving washing course based on receipt of the first and second information, wherein the detergent saving washing course comprises one or more of the softened water laundry washing phases, and
wherein said first select part is configured to allow the operator to select a water laundry washing course among one or more softened water laundry washing courses, a softened water laundry washing course comprising one or more softened water laundry washing phases and being associated with a prefixed detergent amount (QN);
said second select part being configured to allow the operator to input said second information indicative of the at least one detergent saving commands; and
said controller is configured to determine said detergent saving amount (QSi) by reducing said preset detergent amount (QNi) based on said detergent saving commands.

2. The laundry washing machine according to claim 1, wherein:
said detergent information contains detergent saving amount (QSi) data to determine a detergent saving amount (QSi) of the laundry detergent to be loaded in the detergent dispensing assembly and/or to be supplied into the washing tub based on the softened water laundry washing phases of a selected laundry washing course,
the detergent saving amount (QSi) is a reduced laundry detergent amount different from a predetermined nominal amount of detergent (QNi) that is based upon the selected laundry washing course; and the controller is further configured to determine a saved amount of detergent ($\Delta Qi$) of the laundry detergent to be supplied to the washing tub based on said detergent saving amount (QSi), wherein the saved amount of detergent ($\Delta Qi$) is a difference between the detergent saving amount (QSi) and the preset detergent amount (QNi).

3. The laundry washing machine according to claim 2, wherein said controller is configured to provide, by said control panel, said detergent information containing data assisting the operator in determining the detergent saving amount (QSi) to be used to perform said selected laundry washing course.

4. The laundry washing machine according to claim 2, wherein said laundry washing course further comprises one or more fresh water laundry washing phases wherein the fresh water is supplied to the detergent dispensing assembly and/or to the washing tub; and
said controller is configured to determine said detergent saving amount (QSi) based on the softened water laundry washing phases and a fresh water laundry washing phase of the laundry washing course to be performed.

5. The laundry washing machine according to claim 4, wherein said controller is further configured to determine said detergent saving amount (QSi) based on the softened water laundry washing phases, a mix water laundry washing phases and the fresh water laundry washing phase of the laundry washing course to be performed.

6. The laundry washing machine according to claim 2, wherein said laundry washing course further comprises one or more mix water laundry washing phase/s, wherein a mixture of fresh water and softened water is supplied to the detergent dispensing assembly and/or to the washing tub;
said controller being further configured to determine said detergent saving amount (QSi) based on the softened water laundry washing phases and a mix water laundry washing phase of the laundry washing course to be performed.

7. The laundry washing machine according to claim 2, wherein:
said laundry washing course comprises a main laundry wash phase and one or more secondary laundry wash phases following the main laundry wash phase;
said main laundry wash phase comprises at least a wetting phase, a maintenance phase and a drain phase; and
said secondary laundry wash phases comprises one or more rinse phases which start after an end of a drain phase of the main laundry wash phase.

8. The laundry washing machine according to claim 2, wherein said control panel is configured to allow the operator to select a washing course among one or more predetermined detergent saving washing courses, wherein each detergent saving washing course comprises one or more softened water laundry washing phases.

9. The laundry washing machine according to claim 8, comprising memory means containing data relating to the one or more detergent saving washing courses, said data from the memory being indicative of loading of softened water, fresh water, or mix water to the detergent dispensing assembly and/or the washing tub during the washing course of the detergent saving washing courses, and being associated with said detergent saving amount (QSi);
said controller being configured to:
selectively activate said water softening system based on said selected detergent saving washing course in order to supply softened water to the detergent dispensing assembly and/or the washing tub during at least a main laundry wash phase; and determine said detergent saving amount (QSi) in response to said selected detergent saving washing course.

10. The laundry washing machine according to claim 2, wherein said control panel comprises:
a first select part configured to allow the operator to input first information indicative of a laundry washing course; and
a second select part configured to allow the operator to input second information indicative of one or more detergent saving commands; and
wherein said controller is configured to set a detergent saving washing course based on receipt of the first and second information; said detergent saving washing course comprises one or more softened water laundry washing phases.

11. The laundry washing machine according to claim 10, wherein said first select part is configured to allow the operator to select a laundry washing course among one or more predetermined fresh water laundry washing courses, a fresh water laundry washing course comprising only fresh water washing phases, and is associated with a preset detergent amount (QNi); and
said second select part is configured to allow the operator to input said second information indicative of the one or more detergent saving commands associated with respective detergent saving levels;
said controller is further configured to set the detergent saving laundry washing course based on the selected fresh water laundry washing course and said detergent saving commands, and
determine the detergent saving amount (QSi) by reducing said preset detergent amount (QNi) based on said detergent saving commands.

12. The laundry washing machine according to claim 11, wherein said controller is further configured to set the detergent saving washing course by replacing the one or more fresh water washing phases of the fresh water washing course with respective softened water washing phases and/or mix water laundry washing phases, based on said detergent saving commands; and
control said water softening system in response to the softened water washing phases of the set detergent saving washing course to supply softened water during at least a main laundry wash phase and/or during one or more of secondary laundry wash phases.

13. The laundry washing machine according to claim 2, wherein said detergent dispensing assembly comprises detergent dosing means configured to automatically supply detergent to said washing tub based on said determined detergent saving amount (QSi).

14. The laundry washing machine according to claim 2, wherein the control panel is configured to provide the operator with at least one of the following:
an indication of a preset detergent amount (QNi);
an indication of a detergent saving amount (QSi);
an indication of a difference (AQSi) between said preset detergent amount (QNi) and said detergent saving amount (QSi).

15. The laundry washing machine according to claim 2, wherein the softened water has a reduced hardness degree which is lower than about 15 FH.

16. The laundry washing machine according to claim 2, wherein the softened water has a reduced hardness degree which is lower than or equal to about 5 FH.

17. The laundry washing machine according to claim 2, wherein the softened water has a reduced hardness degree which is lower than or equal to about 2 FH.

18. The laundry washing machine according to claim 2, wherein the softened water has a reduced hardness degree which is lower than or equal to about 1 FH.

19. The laundry washing machine according to claim 2, wherein the softened water has a reduced hardness degree which is greater than, or equal to about 15 FH, and lower than, or equal to about 25 FH.

20. The laundry washing machine according to claim 2, wherein a main laundry wash phase comprises a softened water laundry wash phase; each of a secondary laundry wash phase comprises: the softened water laundry wash phase, a fresh water laundry wash phase or a mix water laundry wash phase.

21. The laundry washing machine according to claim 2, wherein said water softening system comprises a water-softening agent container, which is filled with an amount of ion-exchange resins to restrain calcium and/or magnesium ions dissolved in the fresh water flowing across the water-softening agent container, and a regeneration agent reservoir which is structured for receiving an amount of salt grains and is designed to use brine to periodically regenerate said ion-exchange resins contained in said water-softening agent container.

22. The laundry washing machine according to claim 2, wherein the water softening system comprises at least a flow through capacitor.

23. The laundry washing machine according to claim 1, wherein said controller is further configured to control said water softening system in response to the softened water laundry washing phases of the set detergent saving washing course and said detergent saving commands to supply softened water during at least a main laundry wash phase and/or during one or more of secondary laundry wash phases.

* * * * *

UNITED STATES PATENT AND TRADEMARK OFFICE
CERTIFICATE OF CORRECTION

PATENT NO. : 10,494,751 B2
APPLICATION NO. : 15/108816
DATED : December 3, 2019
INVENTOR(S) : Elisa Stabon It is certified that error appears in the above-identified patent and that said Letters Patent is hereby corrected as shown below:

In Column 22, Claim 14, Line 6:
"(AQSi)" should be -- ($\Delta$QSi) --

Page 1 of 1

Signed and Sealed this
Thirty-first Day of March, 2020

Andrei Iancu
*Director of the United States Patent and Trademark Office*